O. P. ERHARDT.
PORTABLE ELECTRIC MOTOR.
APPLICATION FILED FEB. 26, 1918.
1,426,367.
Patented Aug. 22, 1922.
2 SHEETS—SHEET 1.
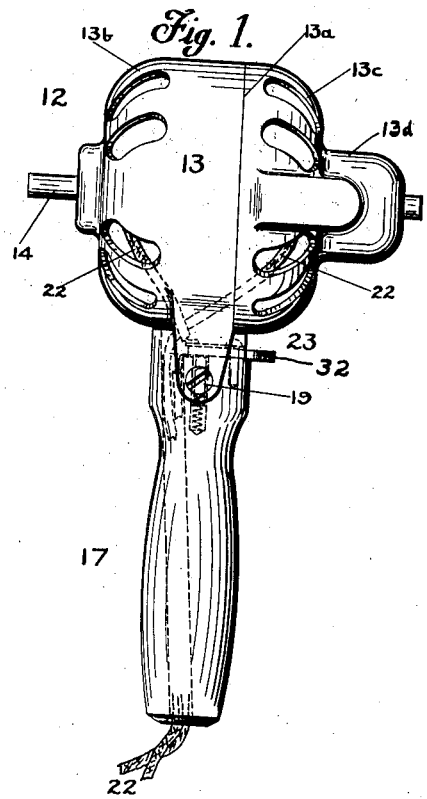
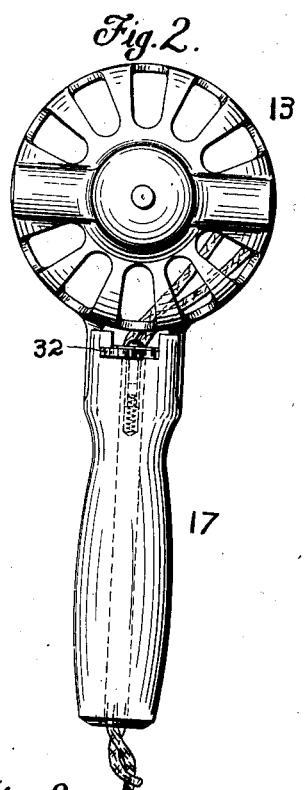
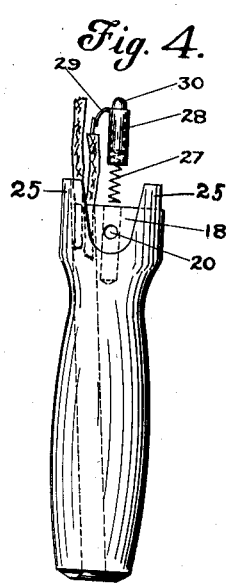
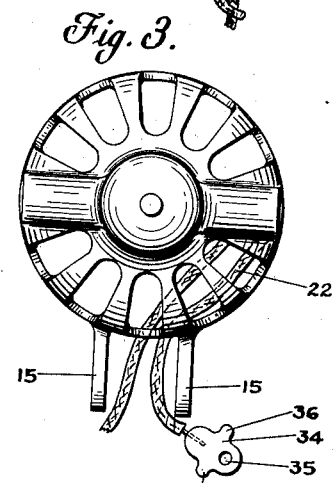
Inventor:
Oscar P. Erhardt
By Henry E. Rockwell
Attorney.

O. P. ERHARDT.
PORTABLE ELECTRIC MOTOR.
APPLICATION FILED FEB. 26, 1918.
1,426,367.
Patented Aug. 22, 1922.
2 SHEETS—SHEET 2.
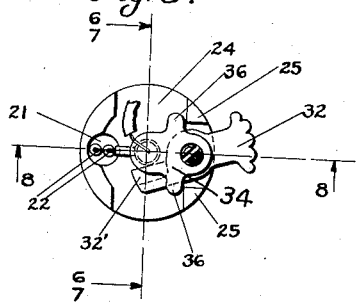
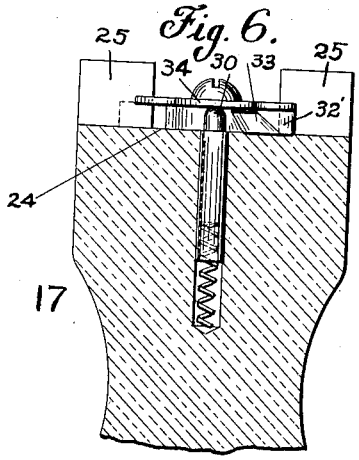
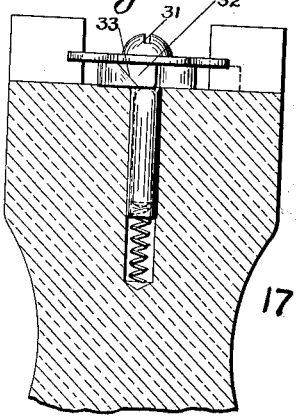
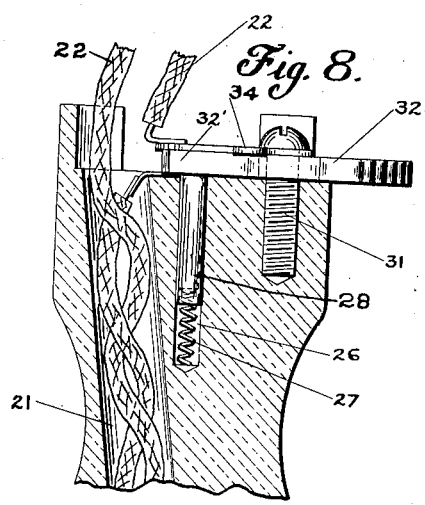
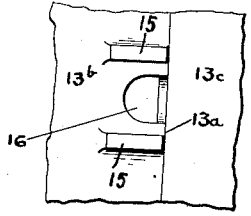
Inventor.
Oscar P. Erhardt
By
Henry E. Rockwell
Attorney.

UNITED STATES PATENT OFFICE.

OSCAR P. ERHARDT, OF WEST HAVEN, CONNECTICUT, ASSIGNOR TO THE A. C. GILBERT COMPANY, OF NEW HAVEN, CONNECTICUT, A CORPORATION OF CONNECTICUT.

PORTABLE ELECTRIC MOTOR.

1,426,367. Specification of Letters Patent. Patented Aug. 22, 1922.

Application filed February 26, 1918. Serial No. 219,258.

*To all whom it may concern:*

Be it known that I, OSCAR P. ERHARDT, a citizen of the United States, residing in the town of West Haven, county of New Haven, and State of Connecticut, have invented certain new and useful Improvements in Portable Electric Motors, of which the following is a full, clear, and exact description.

This invention relates to electric motors, and more particularly to a small portable electric motor provided with a switch mounted upon the motor for controlling the current thereto.

One of the primary objects of my invention is to provide an electric motor with a handle for supporting the same, and with a switch for controlling the current to the motor, the switch being so positioned that it may be conveniently operated by the thumb or a finger of the hand in which the motor handle is held.

Another object of the invention is to so construct and arrange the handle and switch relatively to the motor that convenient and serviceable means are provided for manually supporting the electric motor and for controlling the current to the same.

To these and other ends, the invention consists in the novel features and combinations of parts to be hereinafter described and claimed.

In the accompanying drawings,

Fig. 1 is a side elevation of a small electric motor having a handle secured thereto and showing in dotted lines an electric switch mounted in the handle for controlling the current to the motor;

Fig. 2 is an end elevation of the motor shown in Fig. 1, having the handle secured thereto;

Fig. 3 is a view similar to Fig. 2, but shows the motor having the handle removed therefrom;

Fig. 4 is a side view of the handle removed from its motor, showing parts of the switch partially removed from the handle;

Fig. 5 is a rear end view of the handle, showing the switch applied thereto (the switch being shown closed);

Fig. 6 is an enlarged fragmentary sectional view of the handle taken on line 6—6 of Fig. 5, looking in the direction of the arrows, the switch being shown in its closed position;

Fig. 7 is a view similar to Fig. 6, showing the switch opened;

Fig. 8 is an enlarged fragmentary sectional view taken on line 8—8 of Fig. 5, looking in the direction of the arrows; and Fig. 9 is a fragmentary bottom view of the motor casing shown in Fig. 3.

The motor member 12, which may be of any approved type, comprises a casing 13 generally cylindrical in shape, and a motor shaft 14 extending through the casing. It will be understood, of course, that this motor shaft is fixed to the usual armature (not shown) and that the armature revolves between suitable field windings (not shown), constructed and arranged in the case in the usual or any preferred manner. In the particular example illustrated, the casing 13 is divided transversely along a line 13$^a$, so as to form separate sections 13$^b$ and 13$^c$. The brushes (not shown) are preferably mounted within the projections 13$^b$ formed upon the section 13$^c$. Preferably the motor shaft, which is journalled in the bearings in the respective sections 13$^b$, 13$^c$ extends out at each end to an appreciable distance beyond the outer face of the corresponding section, so that a vibrator or massage wheel or other device may be attached to either end of the shaft. At one part of its periphery, the casing 13 is provided with a pair of lugs 15. These preferably are formed integrally with the casing, and in the present instance they are formed on the section 13$^b$, which is the larger of the two casing sections, said lugs being located at substantially the center of the motor casing but at the lower part thereof, as shown in Fig. 1. The two casing sections are secured together by means of screws or similar securing means (not shown). An opening 16 is formed in the section 13$^b$ at its inner edge between the lugs 15, as shown in Fig. 9, and this opening serves for the passage of the usual electric conductors which extend therethrough into the case, where connection is made with the motor parts. The lugs serve to secure in place a supporting member such as a handle 17, by means of which the motor member may be operated or manipulated when the person using the motor desires to hold the same in his hand. The handle 17 is of substantially cylindrical shape at its upper part, and fits snugly between the lugs 15, the upper part of the handle being cut away at opposite sides to form lug-receiving sockets 18, as shown in Fig. 4, in which the inner face and the edges of the lugs are snugly received. The assemblage is then completed by suitable fastening screws 19, which extend laterally through perforations formed in the respective lugs into screw holes 20, formed in the wood or other material of which the handle is composed. The handle has a longitudinal bore or passage 21 extending completely therethrough, which serves to enclose the wires which pass to the motor through the handle, as shown in dotted lines in Fig. 1. It should be noticed that the passageway 21 does not extend axially through the handle 17, but extends therethrough in an inclined direction, as shown in Figs. 1, 4 and 8. The object in so constructing the passage is to have its inner end so positioned that it will clear a drill hole or socket, hereinafter more fully described, formed centrally within the inner end of the handle. The current for operating the motor 12 is supplied to the same by conductor wires 22, which extend through the passage 21 formed in the handle and through the opening 16 into the motor casing 13.

In order to provide means by which the person using the electric motor herein described may conveniently control the current supplied thereto while supporting the motor by its handle, I have provided an electric switch designated in its entirety by the numeral 23, which switch is so positioned that it may be easily operated to open or close the circuit by a thumb or a finger of the hand which grasps the motor handle. The inner end of the handle 17 has a notch or clearance space formed therein, in which my switch is mounted. This notch or clearance space is so formed that it provides a flat face or surface 24, upon which the switch lever hereinafter described is pivotally mounted, and also forms the two projecting lugs 25, which are produced by cutting away a part of the handle on each side of the lugs, as shown in Fig. 5. The drill hole or socket 26, is formed centrally within the inner end of the handle 17 as above mentioned. In this socket is mounted a coiled spring 27 and a metal sleeve or tube 28, the tube 28 being provided with a curved portion 29 projecting from one side of the same, to which an end of one of the current supply wires 22 is soldered or otherwise secured. Inside of the sleeve or tube 28 is mounted a plunger 30, which is free to slide back and forth therein, and is forced outwardly by the spring 27. The inner end of the handle 17 is provided with a second drill hole, which is positioned substantially midway between the lugs 25. This drill hole has threads formed therein to engage the screw 31, which is mounted therein. Pivotally mounted upon this screw 31 is a manually operable switch lever 32, which is formed of fiber or some other non-conducting material. The outer end of this lever is positioned to extend outwardly beyond the side of the handle, in order that the same may be easily engaged by a finger or thumb of the person using the motor. It will be noticed that the outer end of this lever 32 is made rough, as shown in Figs. 5 and 8, in order that the finger may firmly engage this end without slipping over the same. The inner end 32′ of this lever is positioned to lie over the plunger 30, above mentioned, and is provided with an inclined face 33, which is adapted to contact with the outer end of the plunger 30, in order to force the same into its socket out of engagement with the metal plate 34. The plate 34 has formed at one end thereof a drill hole 35, which is adapted to receive the screw 31. The plate 34 is also provided with projections 36, which are positioned to contact with the lugs 25, as shown in Fig. 5. The plate 34 has one end of the electric conductor wire 22 secured thereto by solder or other means. The parts of the switch just described are assembled and operate as follows: The metal sleeve 28 and the spring 27 are mounted in the socket 26, and the plunger 30 is mounted in the upper end of the metal sleeve. The switch lever 32 and the plate 34 are then secured to the inner end of the handle 17 by the screw 31, which passes through the drill hole 35 formed in the plate 34, and through a corresponding hole formed in the lever 32. The screw 31 thus serves to retain both the pivoted lever 32 and the plate 34 in their proper place. The screw 31 is screwed into its socket a sufficient distance to cause the head of the same to clamp slightly upon the outer face of the plate 34, but not with sufficient force to clamp the lever 32 so that it could not be operated by the thumb or finger of the person using the motor. The plate 34 is so positioned that the inner end of the same extends over the plunger 30 and is retained in this position by the projections 36, which contact with the lugs 25, in order to prevent the plate from swinging about its pivotal mounting upon the screw 31.

The operation of my device, it is thought, will be clearly understood from the above description, when read in connection with the drawings and the following remarks. When the parts of the switch 23 have been secured in place upon the inner end of the handle 17, the handle 17 may then be readily secured to the casing 13 of the motor by means of the lugs 15 and the screws 19, which pass through these lugs into the handle. When the parts are so assembled, one of the current supply wires 22 passes uninterruptedly through the channel 21 formed in the handle 17 into the motor 12, while the other wire 22 extends through the passage 21 formed in the handle and has its end secured to the projection 29 formed upon the metal sleeve 28. From the sleeve 28, the current passes through the plunger 30 (provided this plunger is permitted to come in contact with the plate 34), through the plate 34 and conductor wire 22 into the motor 12. If, however, the switch lever 32 is moved so that its inner end 32' forces the plunger 30 into its socket, as shown in Fig. 7, out of engagement with the plate 34, the circuit will then be broken, so that the current cannot reach the motor. The construction of the sliding plunger 30 and the switch lever 32 is such that the plunger tends to retain the switch lever in either the "on" position shown in Fig. 6, or the "off" position shown in Fig. 7, for since the plunger 30 is retained in frictional engagement with either the contact plate 34 or the inner end 32' of the switch lever by its spring 27, the pressure of this plunger tends to resist a force shifting the lever 32 from one position to the other.

From the above description, it will be seen that I have devised a simple and convenient means for controlling the current to a motor, which means is so positioned within the handle that supports the motor that it may be easily operated by a thumb or one of the fingers of the hand supporting the motor. It will therefore be seen that the motor may be entirely controlled by one hand of the person using the same, thus leaving the other hand of the person free to perform any other function.

It will be understood that my handle having a switch applied thereto may be attached to or used in connection with various types of motors other than the motor herein shown and described, and that various modifications of my handle and switch may be made without departing from the scope of the invention as defined in the claims.

I do not claim herein the specific electric switch mechanism which I have shown and described, as claimed in my application, Serial No. 184,069, filed August 2nd, 1917, nor do I claim herein the idea per se of removably securing a handle to a portable electric motor, as claimed in the Alfred C. Gilbert application, Serial No. 203,975, filed November 26, 1917.

What I claim is:

1. In an electric motor, a motor member having a casing with spaced lugs formed thereupon and extending therefrom in substantial parallelism, a handle member interposed between said lugs and secured to the same, said handle member having an end face spaced from said casing by said lugs, and an electric switch mounted upon said end face.

2. In an electric motor, a casing member having substantially parallel spaced integral lugs projecting therefrom, a motor supporting member interposed between said lugs and secured thereto, the inner end of said member being spaced from the casing by said lugs and an electric switch mounted upon said supporting member between said lugs.

3. In an electric motor, a motor member having a casing with integral spaced lugs projecting therefrom, a handle member interposed between said lugs and secured to the same, the inner end of said handle member being spaced from said motor casing by said lugs and having an electric switch mounted thereon.

4. In an electric motor, a motor member having a casing with integral spaced lugs projecting therefrom, a handle member interposed between said lugs and secured to the same, said handle member having a conductor opening extending throughout the same, conductors extending through said opening, the inner end of said handle member being spaced from the motor casing by said lugs, and an electric switch mounted upon the inner end of said handle member for opening and closing the circuit through said conductor.

5. In an electric motor, a casing having a supporting handle removably secured thereto, an electric switch mounted within said handle upon the inner end thereof, said switch having manually operable means projecting from one side of said handle and pivoted upon an axis extending longitudinally of the handle.

6. In an electric motor, a motor member having a casing with integral spaced lugs projecting therefrom, a handle member interposed between said lugs and secured to the same, said handle member having a notch formed in its inner end, said notch presenting a flat surface spaced from said casing and an electric switch mounted upon said flat surface.

7. In an electric motor, a motor member having a casing with integral spaced lugs projecting therefrom, a supporting member interposed between said lugs and secured thereto, said supporting member having a notch formed therein adjacent the motor member, said notch presenting a flat surface spaced from the casing, and an electric switch mounted on said flat surface having a pivotally mounted controlling element extending out of said notch.

8. In an electric motor, a casing having a pair of spaced securing lugs, said casing provided between said lugs with a conductor opening, a handle member for the motor casing detachably secured in place between said lugs and having a conductor opening formed therethrough, conductors for said motor extending through said openings, and an electric switch mounted upon the inner end of said handle member between said lugs, said switch having a pivotally mounted controlling element extending therefrom, said element being mounted to swing upon an axis disposed longitudinally of the handle, whereby the switch may be conveniently operated by the thumb while the handle member is grasped in the hand.

9. In an electric switch, a motor member having a casing with spaced lugs projecting therefrom, a handle member interposed between said lugs and secured to the same, said handle member having an electric switch secured therein and said switch having a manually operable lever swingable about an axis extending longitudinally of the handle and means for retaining said lever in either one of two positions.

10. In an electric motor, a motor member having a casing with integral spaced lugs projecting therefrom, a handle member interposed between said lugs and secured to the same, said handle member having a conductor opening extending throughout the same, conductors extending through said opening, and an electric switch mounted upon the inner end of said handle member swingable about an axis extending longitudinally of the handle member for opening and closing the circuit through said conductor, said switch being provided with a manually operable member and means for retaining the same in either one of two positions.

11. In an electric motor, a motor member having a casing, a handle member secured to the casing, and an electric switch located on the inner end of said handle member having an operating lever pivoted upon an axis extending longitudinally of the handle.

In witness whereof, I have hereunto set my hand on the 20th day of February, 1918.

OSCAR P. ERHARDT.